(12) United States Patent
Kim

(10) Patent No.: US 10,498,016 B2
(45) Date of Patent: Dec. 3, 2019

(54) ANTENNA AND VEHICLE HAVING THE ANTENNA

(71) Applicant: HYUNDAI MOTOR COMPANY, Seoul (KR)

(72) Inventor: Dongjin Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 291 days.

(21) Appl. No.: 15/385,307

(22) Filed: Dec. 20, 2016

(65) Prior Publication Data

US 2018/0062252 A1 Mar. 1, 2018

(30) Foreign Application Priority Data

Sep. 1, 2016 (KR) .................. 10-2016-0112508

(51) Int. Cl.
| | |
|---|---|
| *H01Q 1/32* | (2006.01) |
| *H01Q 3/24* | (2006.01) |
| *H01Q 13/18* | (2006.01) |
| *H01Q 1/42* | (2006.01) |
| *G01S 7/00* | (2006.01) |
| *G01S 13/93* | (2006.01) |
| *G08G 1/16* | (2006.01) |

(52) U.S. Cl.
CPC .......... *H01Q 1/3291* (2013.01); *G01S 7/006* (2013.01); *H01Q 3/24* (2013.01); *H01Q 13/18* (2013.01); *G01S 13/931* (2013.01); *G08G 1/16* (2013.01); *H01Q 1/42* (2013.01)

(58) Field of Classification Search
CPC ......... H01Q 13/18; H01Q 13/14; H01Q 13/12
See application file for complete search history.

(56) References Cited

U.S. PATENT DOCUMENTS

| 2,718,592 A * | 9/1955 | Smith .................. H01Q 13/02 343/778 |
| 4,042,935 A * | 8/1977 | Ajioka .................. H01Q 13/18 343/795 |
| 2002/0060640 A1* | 5/2002 | Davis .................... G01S 13/583 342/104 |

(Continued)

FOREIGN PATENT DOCUMENTS

| JP | 63-208308 A | 8/1988 |
| JP | H0260031 A | 2/1990 |

(Continued)

OTHER PUBLICATIONS

Notice of Allowance issued in Korean Patent Application No. 10-2016-0112508, dated Jan. 22, 2018.

(Continued)

*Primary Examiner* — Jessica Han
*Assistant Examiner* — Amal Patel
(74) *Attorney, Agent, or Firm* — Morgan, Lewis & Bockius LLP

(57) ABSTRACT

An antenna includes an antenna body formed with a cylindrical shape having a radiation surface, an outer surface and an inner surface, and a plurality of partitions protruding from the inner surface to a central axis of the antenna body, wherein a plurality of radiation apertures is formed by the plurality of partitions, and the plurality of radiation apertures is formed in the radiation surface and is configured to radiate a radio wave.

16 Claims, 18 Drawing Sheets

(56) References Cited

U.S. PATENT DOCUMENTS

2003/0210197 A1\* 11/2003 Cencich ............ H01Q 13/0241
343/786

FOREIGN PATENT DOCUMENTS

| JP | 2005073176 A | 3/2005 |
|---|---|---|
| KR | 1002927630000 B1 | 7/2001 |

OTHER PUBLICATIONS

12 GHz Circular Microstrip Array, JPEG, Photograph by Pierre Dufilie, Apr. 2003. http://www.ecs.umass.edu/ece/pozar/Full%20Circular.jpg.

S. Park et al., "Antenna Selection and Power Control Method for Uniform Circular Array Antennas Beamforming" The Journal of the Korea Institue of Intelligent Transport Systems, vol. 14, Issue 1. 2015. pp. 68-76. http://dx.doi.org/10.12815/kits.2015.14.1.068 (w/ English abstract).

"Beam Switching Cylindrical Array Antenna System" vol. 8, No. 2, Apr. 2000. <http://www.drdo.gov.in/drdo/pub/techfocus/apr2000/beam%20Switching.htm>.

M. Lee et al., "Design of L-Band Cylindrical Active Phase Array Antenna Using Bent Dipoles" Journal of the Institute of Electronics and Information Engineers, 50(6), 2013.6, 43-55. (w/ English abstract).

\* cited by examiner

ANTENNA AND VEHICLE HAVING THE ANTENNA

CROSS-REFERENCE TO RELATED APPLICATION(S)

This application claims the benefit of priority to Korean Patent Application No. 10-2016-0112508, filed on Sep. 1, 2016 with the Korean Intellectual Property Office, the disclosure of which is incorporated herein by reference.

TECHNICAL FIELD

Embodiments of the present disclosure relate to an antenna and a vehicle having the antenna, more particularly to an antenna having a cylindrical shape and a vehicle having the antenna.

BACKGROUND

A vehicle enables transportation on the road using fossil fuel and electricity as power sources.

Recently, it has been common for the vehicle to include an audio device and a video device to allow a driver to listen to music and to watch videos, as well as to simply transport cargo and people. Further, a navigation system has been widely installed in vehicles to display a route to a destination that is desired by the driver.

Recently, there is a growing need for the vehicle to communicate with an external device. For example, in the case of a navigation function to guide the route to the destination, information about the traffic conditions of the road is required to find the optimal route. Since the traffic conditions frequently change, it may be required for the vehicle to acquire the information about the traffic conditions in real time.

In addition the system for driver's safety has been actively developed, e.g. Forward Collision Warning System (FCWS) and Autonomous Emergency Braking (AEB) for ensuring the safety of the driver and for providing convenience of the driver. The Forward Collision Warning System (FCWS) and Autonomous Emergency Braking (AEB) may estimate whether a collision with a proceeding vehicle is likely and a collision estimated time based on location information of the proceeding vehicle detected by a radar device.

A communication device for communication with the external device and a radar device for the forward collision warning includes an antenna configured to send and receive radio waves.

A car antenna technology currently on the market is limited to a patch antenna array. This is because it is possible to implement a light weight and a thin antenna in such an array. However, for the patch array antenna, there may be a dielectric loss caused by the use of a dielectric substrate and thus the performance of the antenna is significantly reduced due to the dielectric loss. In particular, in 5G communication technology or the radar using several tens of GHz or more as a high frequency, the efficiency of the patch antenna is less than 30%. In addition, the patch array antenna uses a feeding structure in series and thus the patch array antenna has an extremely narrow frequency band characteristic.

SUMMARY

Therefore, it is an aspect of the present disclosure to provide an antenna capable of minimizing a space occupied by the antenna and a vehicle having the antenna.

It is an aspect of the present disclosure to provide an antenna having a shape similar with a cable transmitting a high frequency electrical signal and a vehicle having the antenna.

It is an aspect of the present disclosure to provide an antenna capable of outputting radio waves having a directional radial pattern and a vehicle having the antenna.

Additional aspects of the present disclosure will be set forth in part in the description which follows and, in part, will be obvious from the description, or may be learned by practice of the present disclosure.

In accordance with one aspect of exemplary embodiments of the present disclosure, an antenna may include an antenna body formed in a cylindrical shape having a radiation surface, an outer surface and an inner surface, and a plurality of partitions protruded from the inner surface to a central axis of the antenna body. A plurality of radiation apertures formed by the plurality of partitions may be formed in the radiation surface. The plurality of radiation apertures may be configured to radiate a radio wave.

The plurality of the radiation apertures may have the same area and the same shape with each other.

Each of the radiation apertures may have a sector shape in which the central axis of the antenna body corresponds to a vertex.

The plurality of the radiation apertures may be apart from each other by the same distance along the inner surface of the antenna body.

The plurality of the partitions may be apart from each other by the same distance along the inner surface of the antenna body.

The plurality of the partitions may make contact with each other in the central axis of the antenna body.

A cross section of each of the plurality of the partitions in the radiation surface may have a sector shape.

Each of the plurality of the partitions in the radiation surface may have a sector-shaped cone shape, which is extended from the radiation surface along the inner surface.

Each of the plurality of the partitions in the radiation surface may have a sector-shaped cylinder shape, which is extended from the radiation surface along the inner surface.

Each of the plurality of the partitions may be extended from the inner surface to the central axis of the antenna body along the radiation surface and a length protruded toward the central axis may vary inversely with a distance from the radiation surface.

Each of the plurality of the partitions may be extended from the inner surface to the central axis of the antenna body along the radiation surface and a length protruded toward the central axis may be constant.

The antenna may further include a feeding pin provided inside of the antenna body configured to radiate a radio wave to the inside of the antenna body.

A radio wave radiated from the feeding pin may be divided by the plurality of the partitions and radiated to a free space via the plurality of the radiation apertures.

In accordance with exemplary aspects of the present disclosure, a vehicle may include at least one of a wireless communication device configured to communicate with an external device via an antenna and a radar device configured to detect an external object via an antenna. The antenna may include an antenna body formed in a cylindrical shape having a radiation surface, an outer surface, and an inner surface, a plurality of partitions protruded from the inner surface to a central axis of the antenna body. A plurality of radiation apertures formed by the plurality of partitions may be formed in the radiation surface, and the plurality of radiation apertures may be configured to radiate a radio wave.

The plurality of the radiation apertures may have the same area and the same shape with each other.

Each of the plurality of the radiation apertures may have a sector shape in which the central axis of the antenna body corresponds to a vertex.

The plurality of the radiation apertures may be apart from each other by the same distance along the inner surface of the antenna body.

The plurality of the partitions may be apart from each other by the same distance along the inner surface of the antenna body.

The plurality of the partitions may make contact with each other in the central axis of the antenna body.

The antenna may further include a feeding pin provided inside of the antenna body configured to radiate a radio wave to the inside of the antenna body.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
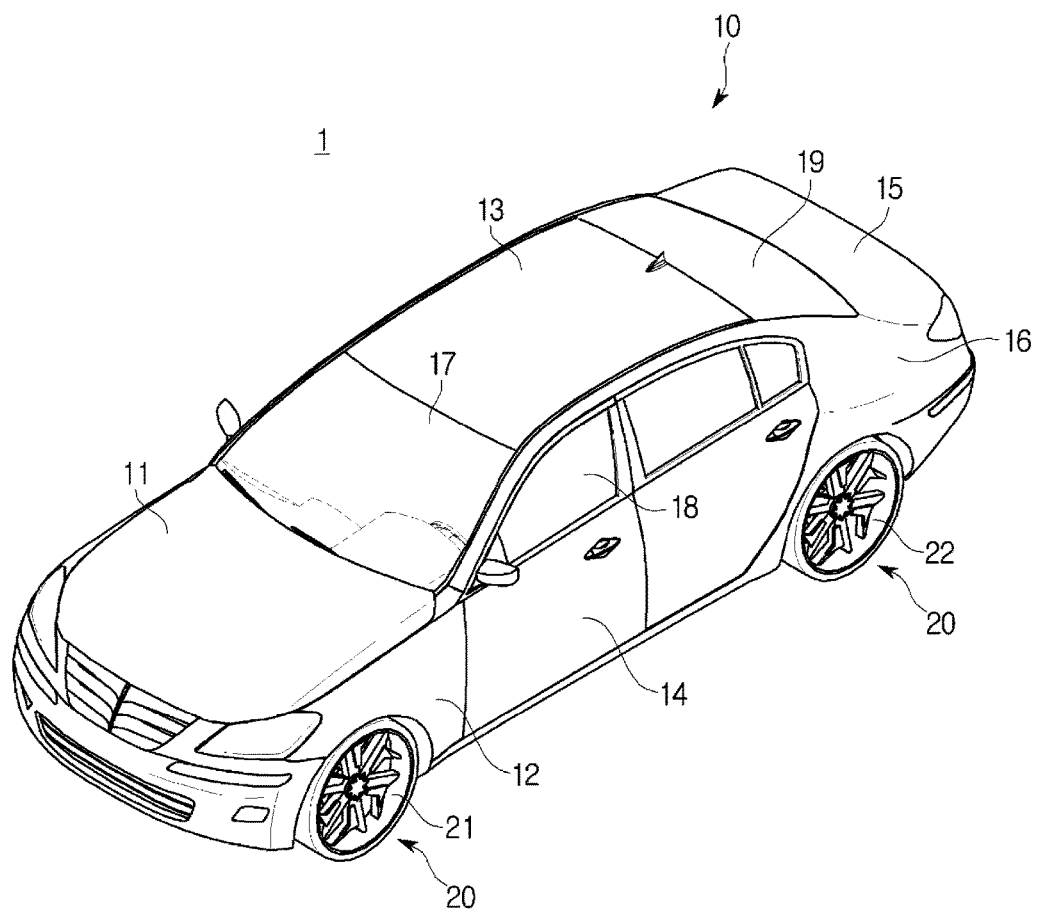
FIG. 1 is a view illustrating an exterior of a vehicle in accordance with exemplary embodiments of the present disclosure.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

Parts which are not associated with the description are omitted in order to specifically and clearly describe the present disclosure, and like reference numerals refer to like elements throughout the specification.

Figure 2:
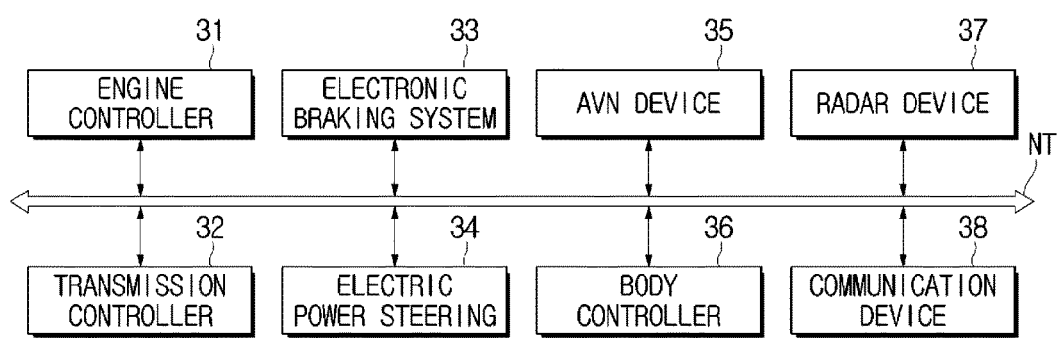
FIG. 2 is a view illustrating an electronic device of a vehicle in accordance with exemplary embodiments of the present disclosure.

FIG. 1 is a view illustrating an exterior of a vehicle in accordance with exemplary embodiments of the present disclosure and FIG. 2 is a view illustrating an electronic device of a vehicle in accordance with exemplary embodiments of the present disclosure.

As illustrated in FIG. 1, a vehicle 1 may include a body 10 forming an exterior of the vehicle 1 and accommodating a variety of components, and a vehicle wheel 20 moving the vehicle 1.

The body 10 may include a hood 11, a front fender 12, a roof panel 13, a door 14, a trunk lid 15 and a quarter panel 16 to form an inner space in which a driver is located. To provide a view to a driver, a front window 17 may be installed in the front side of the body 10 and a side window 18 may be installed in a lateral side of the body 10. Further, a rear window 19 may be installed in a rear side of the body 10.

The vehicle wheel 20 may include a front wheel 21 provided in the front side of the vehicle, and a rear wheel 22 provided in the rear side of the vehicle, wherein the vehicle 1 may move back and forth by a rotation of the vehicle wheel 20.

For the drive of the vehicle 1, a power system, a power train, a steering system and a brake system may be provided in the inside of the body 10. The power system may be configured to generate a torque of the vehicle wheel 20 and include an engine, a fuel device, a cooling device, an exhaust system and an ignition system, and the power train may be configured to transmit the torque generated by the power system to the vehicle wheel 20 and include a clutch, a gear lever, a transmission a differential device and a drive shaft. The steering system may be configured to change a driving direction of the vehicle 1 and include a steering wheel, a steering gear, and a steering link. In addition, the brake system may be configured to stop a driving of the vehicle 1 by stopping the rotation of the vehicle wheel 20 and include a brake pedal, a master cylinder, a brake disk, and a brake pad.

For the control of the vehicle 1 and the safety and convenience of the passenger and the driver, the vehicle 1 may include a variety of electronic control devices 30 of the vehicle 1, as well as the above mentioned mechanical devices.

For example, as illustrated in FIG. 2, the vehicle 1 may include an engine controller 31, a transmission controller 32, an electronic braking system 33, an electric power steering 34, an Audio/Video/Navigation (AVN) device 35, a body controller 36, a radar device 37 and a wireless communication device 38.

The engine controller 31 may perform a fuel injection control, an air-fuel ratio feedback control, a lean combustion control, an ignition timing control and an idling speed control.

The transmission controller 32 may perform a transmission control, a damper clutch control, a pressure control when a friction clutch is turned on/off and an engine torque control during shifting. In exemplary embodiments, the engine controller 31 and the transmission controller 32 may be implemented with hardware devices, such as one or more processors and/or sensors.

The electronic braking system 33 may control a braking system of a vehicle 1, and include an Anti-lock Brake System (ABS).

The electric power steering 34 may assist a driver's steering operation by reducing a steering force during driving at a low-speed or during parking, and by increasing the steering force during driving at high-speed.

In response to a user's input, the AVN device 35 may output music or an image or display a route to a destination that is input by the driver.

The body controller 36 may control an operation of the electronic control device configured to provide the convenience to the driver and to secure the safety of the driver. For example, the body controller 36 may control a power window, a door lock device, a wiper, a head lamp, an interior light, a sun roof, a power seat and a seat heating wire.

The radar device 37 may detect an obstacle or another vehicle in a front, rear and/or lateral side of the vehicle 1. The radar device 37 may be used for a forward collision avoidance function, a lane departure warning function, a blind spot detection function, and a rear detection function. For example, the radar device 37 may include a Forward Collision Warning System (FCW), an Advanced Emergency Braking System (AEBS), an Adaptive Cruise Control (ACC), a Lane Departure Warning System (LDWS), a Lane Keeping Assist System (LKAS), a Blind Spot Detection (BSD) and a Rear-end Collision Warning System (RCW).

The wireless communication device 38 may communicate with another vehicle, a user's terminal or a communication relay device through a wireless communication technology. The wireless communication device 38 may be used for a vehicle to vehicle communication (V2V communication), a vehicle to infrastructure communication (V2I communication), a vehicle to nomadic devices communication (V2N communication) and a vehicle to grid communication (V2G communication).

The wireless communication device 38 may transmit and receive a signal by using a variety of communication protocols. For example, the wireless communication device 38 may employ a 2G communication method, e.g. Time Division Multiple Access (TDMA) and Code Division Multiple Access (CDMA), a 3G communication method, e.g. Wide Code Division Multiple Access (WCDMA), a Code Division Multiple Access (CDMA) 2000, a Wireless Broadband (Wibro), and a World Interoperability for Microwave Access (WiMAX), and a 4G communication method, e.g. Long Term Evolution (LTE) and Wireless Broadband Evolution. In addition, the wireless communication device 38 may employ a 5G communication method.

A variety of the electric control devices 30 included in the vehicle 1 may communicate with each other via a vehicle communication network (NT).

For example, the engine controller 31, the transmission controller 32, the electronic braking system 33, the electric power steering 34, the Audio/Video/Navigation (AVN) device 35, the body controller 36, the radar device 37 and the wireless communication device 38 may send and receive data via the vehicle communication network (NT). The vehicle communication network (NT) may employ a communication standard, e.g. Media Oriented Systems Transport (MOST) having a maximum communication speed of 24.5 (Mega-bits per second) Mbps, FlexRay having a maximum communication speed of 10 Mbps, Controller Area Network (CAN) having a communication speed of 125 (kilo-bits per second) kbps to 1 Mbps, and Local Interconnect Network (LIN) having a communication speed of 20 kbps. The vehicle communication network (NT) may employ a single communication standard, e.g. MOST, FlexRay, CAN and LIN, but also may employ a plurality of communication standards. In exemplary embodiments, the body controller 36 may be implemented with hardware devices, such as one or more processors and/or sensors.

The above mentioned electric control device 30 may be an example of electronics installed in the vehicle 1. In the vehicle 1, an electronic device that is different from the above mentioned electric control device 30 may be installed, an additional electronic device may be installed other than the above mentioned electric control device 30, and a part of the above mentioned electric control device 30 may be omitted.

Hereinafter, the above mentioned radar device 37 and the wireless communication device 38 will be described in detail.

Figure 3:
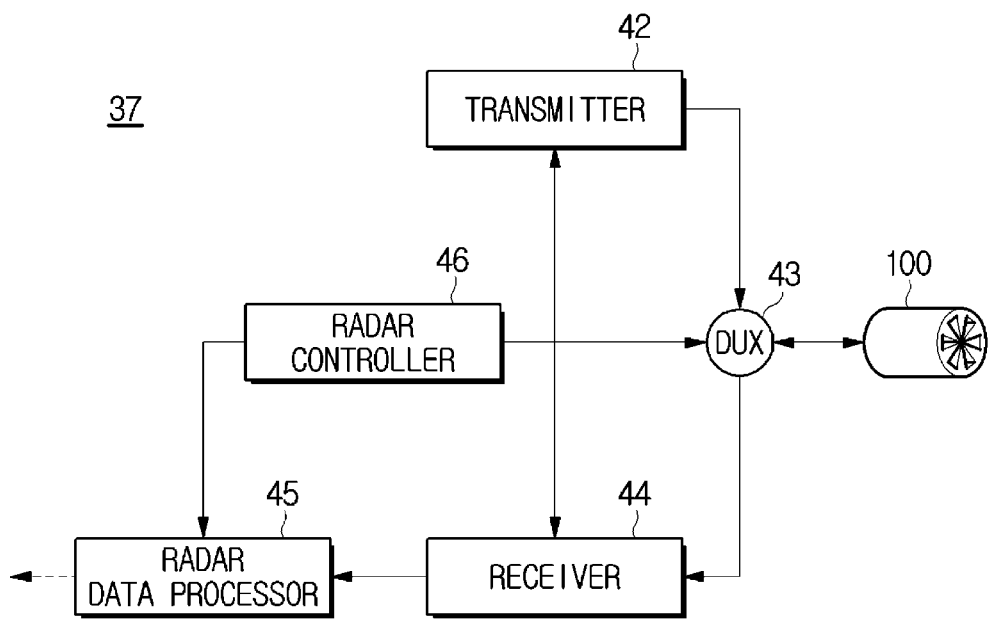
FIG. 3 is a view illustrating an example of a radar device included in a vehicle in accordance with exemplary embodiments of the present disclosure.

FIG. 3 is a view illustrating an example of a radar device included in a vehicle in accordance with exemplary embodiments of the present disclosure.

As illustrated in FIG. 3, the radar device 37 may include a transmitter 42, a duplexer 43, a receiver 44, a radar data processor 45, a radar controller 46 and an antenna 100.

The transmitter 42 may generate a radio frequency transmission signal using a radio frequency (RF) signal of a local oscillator.

The duplexer 43 may provide the radio frequency transmission signal received from the transmitter 42 to the antenna 100, or a reflection signal of the radio frequency received from the antenna 100 to the receiver 44.

The receiver 44 may extract radar data from the reflection signal received from the duplexer 43 using the radio frequency (RF) signal of the local oscillator.

The radar data processor 45 may extract location information of an object by processing the radar data received from the receiver 44.

The radar controller 46 may control an operation of the transmitter 42, the duplexer 43, the receiver 44, the radar data processor 45 and the antenna 100.

The antenna 100 may radiate the radar signal received from the duplexer 43 to a free space and then provide a reflection signal received from the free space to the duplexer 43.

As mentioned above, the radar device 37 may radiate the radio frequency transmission signal to the free space via the antenna 100, and estimate location information of the object by acquiring a reflection signal reflected from the object via the antenna 100.

Figure 4:
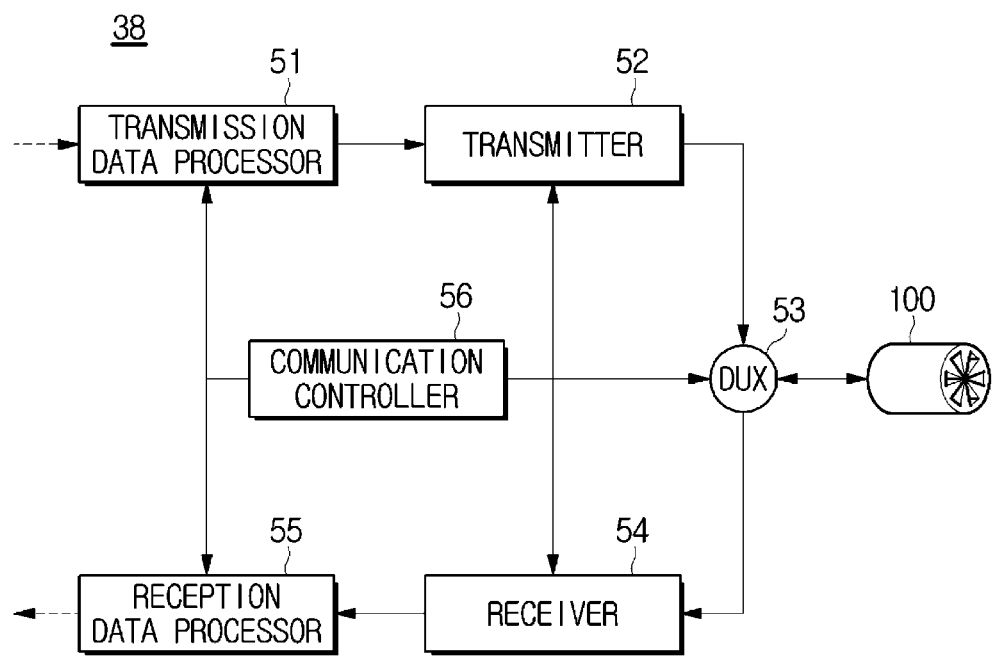
FIG. 4 is a view illustrating an example of a wireless communication device included in a vehicle in accordance with exemplary embodiments of the present disclosure.

FIG. 4 is a view illustrating an example of a wireless communication device included in a vehicle in accordance with exemplary embodiments.

As illustrated in FIG. 4, the wireless communication device 38 may include a transmission data processor 51, a transmitter 52, a duplexer 53, a receiver 54, a reception data processor 55, a communication controller 56 and an antenna 100.

The transmission data processor 51 may convert digital transmission data received from another electronic device into a low frequency transmission signal, and provide the low frequency transmission signal to the transmitter 52.

The transmitter 52 may modulate the low frequency transmission signal into a radio frequency transmission signal using a radio frequency (RF) signal of a local oscillator.

The duplexer 53 may provide the radio frequency transmission signal received from the transmitter 52 to the antenna 100, or a radio frequency reception signal received from the antenna 100 to the receiver 54.

The receiver 54 may demodulate the radio frequency reception signal received from the duplexer 53 using the radio frequency (RF) signal of the local oscillator.

The reception data processor 55 may convert a low frequency reception signal received from the receiver 54 into digital reception data.

The communication controller 56 may control an operation of the transmission data processor 51, the transmitter 52, the duplexer 53, the receiver 54, the reception data processor 55 and the antenna 100.

The antenna 100 may radiate the radar signal received from the duplexer 53 to a free space and then provide a reflection signal received from the free space to the duplexer 53.

As mentioned above, the wireless communication device 38 may transmit the radio frequency transmission signal to an external device via the antenna 100, and receive the radio frequency reception signal from the external device via the antenna 100.

The radar device 37 and the wireless communication device 38 may include the antenna 100 in common and the configurations and functions of the antenna 100 of the radar device 37 and the antenna 100 of the wireless communication device 38 may be substantially identical to each other.

The performance of the radar device 37 and the wireless communication device 38 may be determined by the property of the antenna 100. For example, when using millimeter wave in which a frequency is 30-300 GHz (Giga Hertz) and a wavelength is 10-1 mm, the performance of the radar device 37 and the wireless communication device 38 may substantially depend on the properties of the antenna 100.

Further, an array antenna may be used for improving the performance of the antenna 100.

Hereinafter an antenna included in a vehicle according to exemplary embodiments of the present disclosure will be described.

Figure 5:
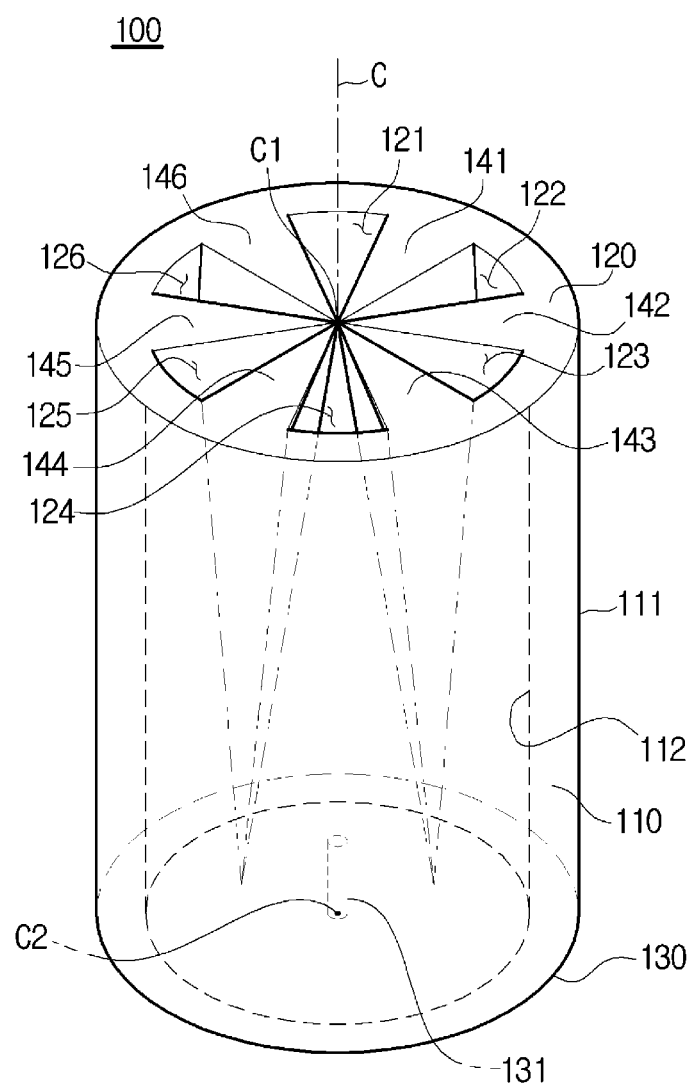
FIG. 5 is a view illustrating an antenna in accordance with exemplary embodiments of the present disclosure.
Figure 6:
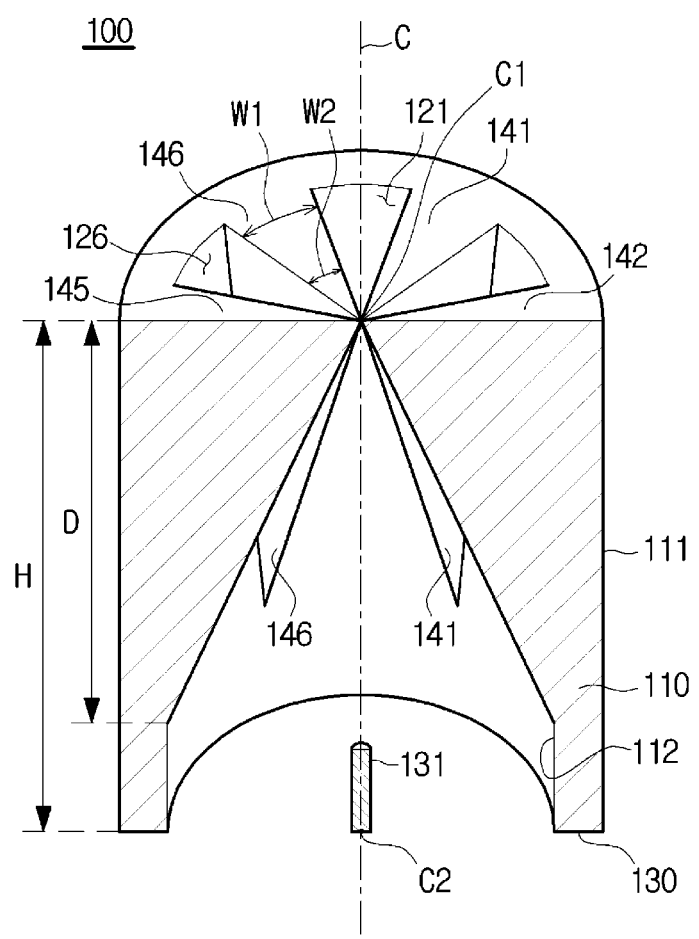
FIG. 6 is a vertical cross-sectional view illustrating the antenna structure shown in FIG. 5.
Figure 7A:
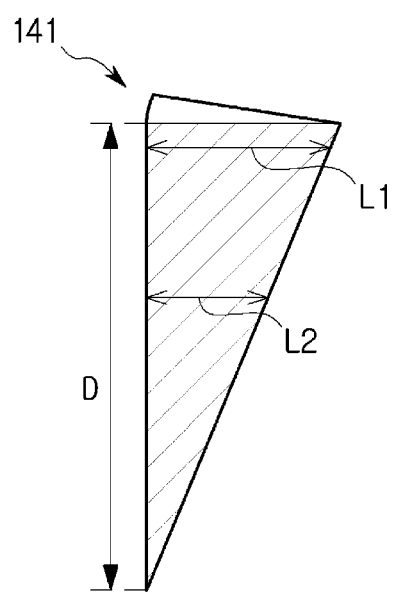
FIGS. 7A and 7B are views illustrating a partition of the antenna shown in FIG. 5.
Figure 7B:
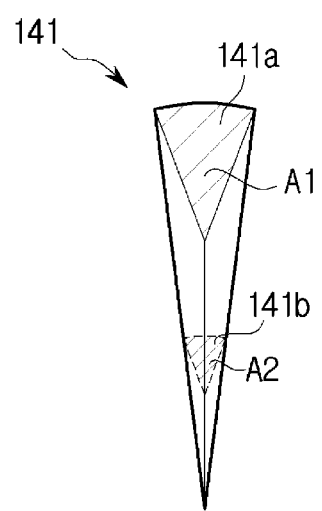
Figure 8:
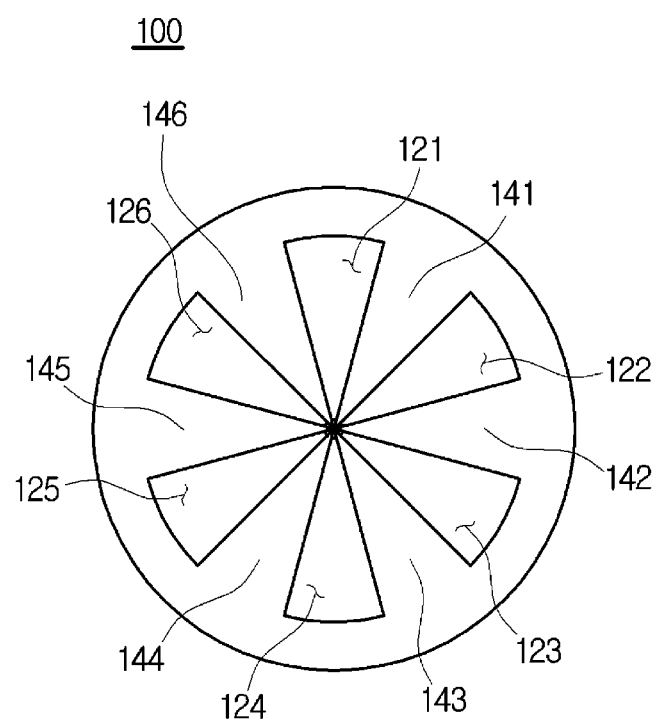
FIG. 8 is a view illustrating a radiation surface of the antenna shown in FIG. 5.

FIG. 5 is a view illustrating an antenna in accordance with exemplary embodiments of the present disclosure. FIG. 6 is a vertical cross-sectional view illustrating the antenna structure shown in FIG. 5. FIGS. 7a and 7b are views illustrating a partition of the antenna shown in FIG. 5. Further, FIG. 8 is a view illustrating a radiation surface of the antenna shown in FIG. 5.

As illustrated in FIG. 5, an antenna 100 may include an antenna body 110 having a cylindrical shape in which a hollow, or a cavity or a hollow area, is formed, A radiation surface 120 and a feeding surface 130 may be formed in an upper side and a lower side of the antenna body 110, respectively. The radiation surface 120 and the feeding surface 130 may be formed in a circular shape, and the radiation surface 120 and the feeding surface 130 may have the same diameter. Further a center (C1) of the radiation surface and a center (C2) of the feeding surface 130 may be disposed on a central axis (C) of the antenna body 110 having the cylindrical shape.

In the outside of the antenna body 110, an outer surface 111 may be formed along a circumference of the radiation surface 120 and the feeding surface 130. The outer surface 111 may be provided between the radiation surface 120 and the feeding surface 130 wherein a direction to which the outer surface 111 is directed is perpendicular to a direction to which the radiation surface 120 and the feeding surface 130 are directed.

In the inside of the antenna body 110, a hollow or hollow area or hollow cavity, passing through the antenna body 110 may be formed in a direction perpendicular to the radiation surface 120 and the feeding surface 130. The hollow may have a cylindrical shape and a central axis of the hollow may be identical to the central axis (C) of the antenna body 110.

Further, an inner surface 112 facing the hollow may be formed in the inside of the antenna body 110. The inner surface 112 may be provided between the radiation surface 120 and the feeding surface 130, wherein a direction to which the inner surface 112 is directed is perpendicular to a direction to which the radiation surface 120 and the feeding surface 130 are directed.

As a result, the antenna body 110 may have a hollow cylindrical shape with the outer surface 111 and the inner surface 112 together with opposite bottom surfaces, i.e., the radiation surface and the feeding surface.

The antenna body 110 may be formed of electrically conductive material.

In the inside of the antenna 100, a plurality of partitions 141, 142, 143, 144, 145 and 146 may be provided.

As illustrated in FIG. 6, the plurality of the partitions 141-146 may be protruded from the inner surface 112 of the antenna body 110 to the central axis (C) of the antenna body 110. Due to the plurality of the partitions 141-146, a part of the radiation surface 120 of the antenna body 110 may be closed, and a plurality of radiation apertures 121,122, 123, 124, 125 and 126 may be formed between the plurality of the partitions 141-146. A detail description of the plurality of the radiation apertures 121-126 will be described below.

According to the drawings, the plurality of the partitions 141-146 may be provided to be apart from each other by the same distance along the inner surface 112 of the antenna body 110, but the arrangement of the plurality of the partitions 141-146 is not limited thereto. For example, the plurality of the partitions 141-146 may be irregularly arranged along the inner surface 112 of the antenna body 110.

Further, the drawings illustrate that six partitions 141-146 are described, but the number of the partitions is not limited thereto. Thus, the number of the partitions may be less than or more than six.

The plurality of the partitions 141-146 may make contact with each other around the central axis (C) of the antenna body 110. Since the plurality of the partitions 141-146 makes contact with each other around the central axis (C) of the antenna body 110, the area around of the center (C1) of the radiation surface 120 may be closed.

A width (W1 and W2) of the plurality of the partitions 141-146 may vary inversely with a distance from the inner surface 112 of the antenna body 110 and vary directly with a distance from the central axis (C) of the antenna body 110. Particularly, the width (W1) of the plurality of the partitions 141-146 adjacent to the inner surface 112 of the antenna body 110 may be larger than the width (W2) of the plurality of the partitions 141-146 adjacent to the central axis (C) of the antenna body 110.

As a result, a horizontal cross section of the plurality of the partitions 141-146, i.e. a cross section perpendicular to the central axis (C) of the antenna body 110, may have a sector shape. Particularly, the horizontal cross section of the plurality of the partitions 141-146 in the radiation surface 120 of the antenna body 110 may have a sector shape in which the central axis (C) of the antenna body 110 corresponds to a vertex.

In addition, the plurality of the partitions 141-146 may be downwardly extended from the radiation surface 120 of the antenna body 110 to the feeding surface 130. In this time, a distance (D1) in which the plurality of the partitions 141-146 is extended from the radiation surface 120 to the feeding surface 130 may be less than a height (H) of the antenna body 110. In other words, the plurality of the partitions 141-146 may be extended from the radiation surface 120 of the antenna body 110 to a certain height or to the feeding surface 130.

In addition, a length (L1 and L2) in which the plurality of the partitions 141-146 is protruded from the inner surface 112 of the antenna body 110 to the central axis (C) may vary inversely with a distance from the radiation surface 120. Particularly, as illustrated in FIG. 7A, the length (L1) in which the plurality of the partitions 141-146 adjacent to the radiation surface 120 of the antenna body 110 is extended to the central axis (C) may be larger than the length (L2) in which the plurality of the partitions 141-146 adjacent to a middle height of the antenna body 110 is extended to the central axis (C). As a result, a vertical cross section of the plurality of the partitions 141-146, i.e., a cross section parallel with the central axis (C) of the antenna body 110 may have a right triangle shape.

In addition, a horizontal cross section of the plurality of the partitions 141-146, that is an area of a cross section perpendicular to the central axis (C) of the antenna body 110 may vary inversely with a distance from the radiation surface 120. Particularly, as illustrated in FIG. 7B, an area (A1) of a horizontal cross section 141a of the plurality of the partitions 141-146 in the radiation surface 120 of the antenna body 110 may be larger than an area (A2) of a horizontal cross section 141b of the plurality of the partitions 141-146 in the center of the antenna body 110.

As a result, the plurality of the partitions 141-146 may have a polygonal pyramid shape with a sector-shaped bottom. In addition, a vertical cross section of the sector-shaped cone forming the plurality of the partitions 141-146 may be a right triangle.

Since the plurality of the partitions 141-146 has the polygonal pyramid shape with a sector-shaped bottom, a radio wave inside of the antenna 100 may be smoothly divided along a side wall of the plurality of the partitions 141-146, and then radiated to the free space via the plurality of the radiation apertures 121-126 formed between the plurality of the partitions 141-146.

The plurality of the partitions 141-146 may be formed of electrically conductive material, as with the antenna body 110.

The plurality of partitions 141-146 and the antenna body 110 may be integrally formed with each other. For example, the plurality of partitions 141-146 and the antenna body 110 may be integrally manufactured with each other by using a 3D printer or by depositing a plurality of metal plates.

Alternatively, the plurality of partitions 141-146 and the antenna body 110 may be individually manufactured and then assembled together.

As illustrated in FIG. 8, the radiation surface 120 may be divided into the plurality of the radiation apertures 121-126 by the plurality of the partitions 141-146. In other words, the plurality of the radiation apertures 121-126 may be formed on the radiation surface 120 by the antenna body 110 and the plurality of the partitions 141-146.

The number of the radiation apertures 121-126 may be determined by the number of partitions 141-146. For example, when the antenna 100 includes six partitions 141-146, six radiation apertures 121-126 may be formed. However, the number of the partition and the number of the radiation aperture is not limited to six. The antenna 100 may include less than or more than six partitions, and thus less than or more than six radiation apertures may be formed.

An area of the radiation apertures 121-126 may be determined by an area occupied by the partitions 141-146. Particularly, the area of the radiation apertures 121-126 may be reduced as the area occupied by the partitions 141-146 is increased, and the area of the radiation apertures 121-126 may be increased as the area occupied by the partitions 141-146 is reduced.

Each of the radiation apertures 121-126 may have a sector shape in which a center (C1) of the radiation surface 120 corresponds to a vertex.

When each of the plurality of the partitions 141-146 is apart from each other by the same distance along the inner surface 112 of the antenna body 110, each of the areas of the radiation apertures 121-126 may be the same with each other. Alternatively, when each of the plurality of the partitions 141-146 is irregularly disposed along the inner surface 112 of the antenna body 110, each of the areas of the radiation apertures 121-126 may be different from each other.

Further, a diameter of bottom (the radiation surface and the feeding surface) of the antenna body 110, a height of the antenna body 110, and an area of the radiation apertures 121-126 may vary according to a frequency of radio wave intended to be radiated through the antenna 100.

A feeding pin 131 configured to supply power to the antenna 100 may be provided on the feeding surface 130 of the antenna body 110. The feeding pin 131 may be a signal line of a cable (not shown) configured to output a signal to the antenna 100.

The feeding pin 131 may be provided on the center (C2) of the feeding surface 130, but a position of the feeding pin 131 is not limited to the center (C2) of the feeding surface 130. Thus, the feeding pin 131 may be disposed on any position of the feeding surface 130.

The feeding pin 131 may receive a high frequency signal, which is intended to be radiated through the antenna 100, from the cable, and radiate the received high frequency signal to the inside of the antenna 100, in the form of radio waves. In other words, a high frequency radio wave may be generated in the inside of the antenna 100 by the high frequency signal transmitted to the feeding pin 131.

In addition, the high frequency radio wave generated in the inside of the antenna 100 may be divided by the plurality of the partitions 141-146, and then radiated via one or more of the radiation apertures 121-126. A distance, in which each of the radio wave radiated via the radiation apertures 121-126 is radiated in the inside of the antenna 100, may be the same with each other. Therefore, a phase and amplitude of the radio wave radiated through the radiation apertures 121-126 may be the same as each other.

As a result, the radio wave radiated from the antenna 100 may have the directivity.

Figure 9:
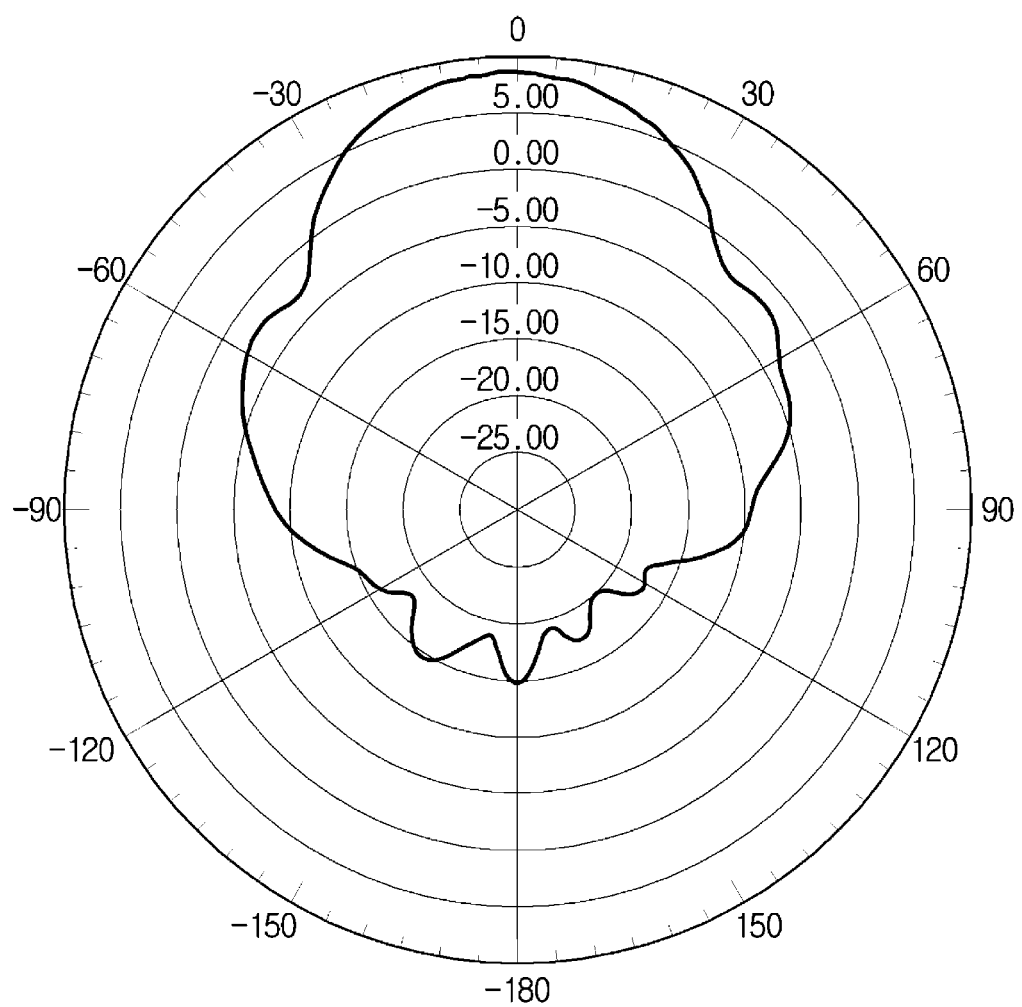
FIG. 9 is a view illustrating a radial pattern of a radio wave radiated from the antenna shown in FIG. 5.

FIG. 9 is a view illustrating a radial pattern of a radio wave radiated from the antenna shown in FIG. 5. Particularly, FIG. 9 illustrates the intensity of the radio wave radiated by the antenna 100 about a direction in which the radio wave is radiated, with respect to a direction to which the central axis (C) of the antenna 100 is directed.

As illustrated in FIG. 9, the radio wave radiated from the antenna 100 may be focused in a direction perpendicular to the radiation surface 120 of the antenna 100. In other words, the radio wave radiated along the central axis (C) of the antenna 100 may have the strongest electricity and the radio wave radiated from the antenna 100 may have the directivity toward the central axis (C) of the antenna 100.

The antenna 100 may have a cylindrical shape and include the radiation surface 120 in, or on, which the plurality of the radiation apertures 121-126 are formed. The radio wave, or waves, radiated via the plurality of the radiation apertures 121-126 may have the directivity focused in a direction perpendicular to the radiation surface 120

Further, since the feeding surface 130 has a circular shape, it may be connected to a coaxial cable supplying a signal. In addition, the antenna 100 may easily adjust an antenna gain by changing the diameter of the antenna body 110 or changing the area of the radiation apertures 121-126.

The antenna radiating the radio wave having the directivity is not limited to the antenna 100 shown in FIGS. 5 to 8.

Hereinafter an antenna radiating a radio wave having directivity will be described according to exemplary embodiments.

Figure 10:
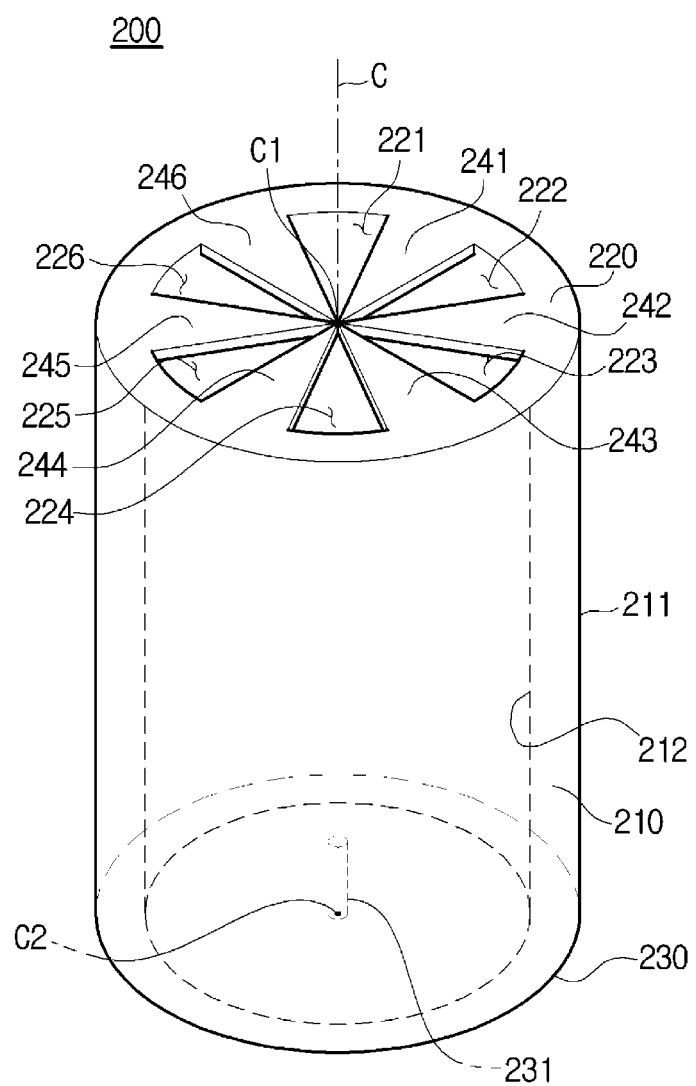
FIG. 10 is a view illustrating an antenna in accordance with exemplary embodiments of the present disclosure.
Figure 11:
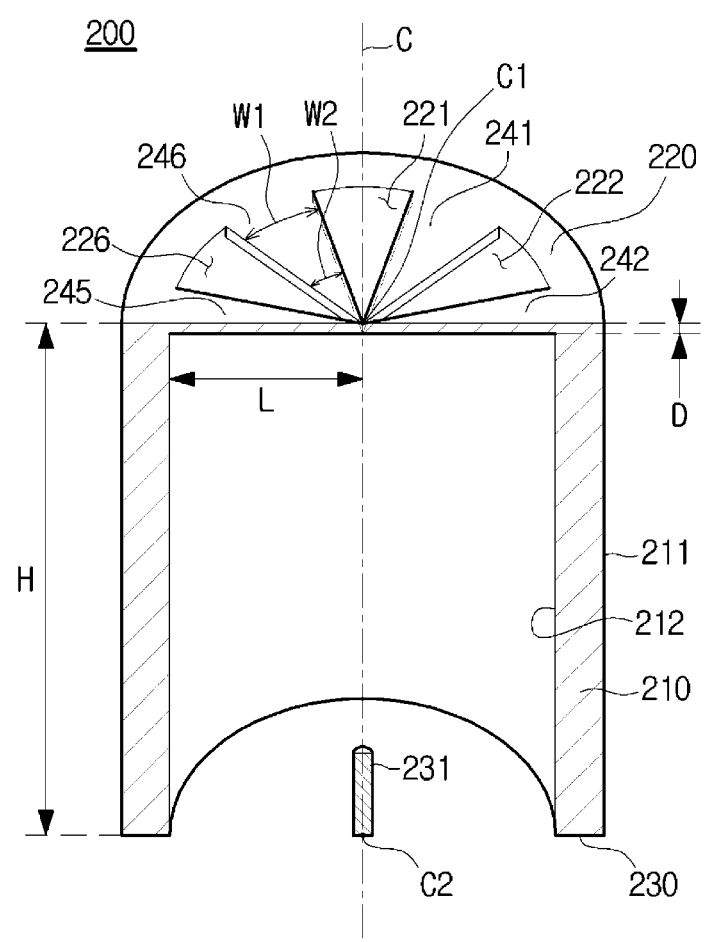
FIG. 11 is a vertical cross-sectional view illustrating the antenna shown in FIG. 10.

FIG. 10 is a view illustrating an antenna in accordance with exemplary embodiments of the present disclosure. FIG. 11 is a vertical cross-sectional view illustrating the antenna shown in FIG. 10.

As illustrated in FIG. 10, an antenna 200 may include an antenna body 210 having a cylindrical shape with a hollow, hollow area or cavity.

A radiation surface 220 and a feeding surface 230 may be formed in an upper side and a lower side of the antenna body 210, respectively. In the outside of the antenna body 210, an outer surface 211 may be formed along a circumference of the radiation surface 220 and the feeding surface 230. In the inside of the antenna body 210, an inner surface 212 facing the hollow may be formed.

The structure of the antenna body 210 may be the same as the structure of the antenna body 110 shown in FIG. 5, and thus a detailed description thereof will be replaced by the description of a structure of the antenna body 110 shown in FIG. 5.

In the inside of the antenna body 210, a plurality of partitions 241, 242, 243, 244, 245 and 246 may be provided.

As illustrated in FIG. 11, the plurality of the partitions 241-246 may be protruded from the inner surface 212 of the antenna body 210 to a central axis (C) of the antenna body 210. Due to the plurality of the partitions 241-246, a part of the radiation surface 220 of the antenna body 210 may be closed, and a plurality of radiation apertures 221-226 may be formed between the plurality of the partitions 241-246.

However, the arrangement and the number of the plurality of the partitions 241-246 may be not limited to those shown in FIGS. 10 and 11.

The plurality of the partitions 241-246 may make contact with each other around the central axis (C) of the antenna body 210. Since the plurality of the partitions 241-246 makes contact with each other around the central axis (C) of the antenna body 210, the area around of the center (C1) of the radiation surface 220 may be closed.

A width (W1 and W2) of the plurality of the partitions 241-246 may vary inversely with a distance from the inner surface 212 of the antenna body 210 and vary directly with a distance to the central axis (C) of the antenna body 210. Particularly, the width (W1) of the plurality of the partitions 241-246 adjacent to the inner surface 212 of the antenna body 210 may be larger than the width (W2) of the plurality of the partitions 241-246 adjacent to the central axis (C) of the antenna body 210.

As a result, a horizontal cross section of the plurality of the partitions 241-246, i.e. a cross section perpendicular to the central axis (C) of the antenna body 210, may have a sector shape in which the central axis (C) of the antenna body 210 corresponds to a vertex.

The plurality of the partitions 241-246 may be downwardly extended from the radiation surface 220 of the antenna body 210 to the feeding surface 230. A distance in which the plurality of the partitions 241-246 is extended from the radiation surface 220 to the feeding surface 230, i.e., a thickness (D) of the plurality of the partitions 241-246 may be less than a height (H) of the antenna body 210. Particularly, the thickness (D) of the plurality of the partitions 241-246 may be sufficiently thin and in this case, the plurality of the partitions 241-246 may have a plate shape.

A length (L1) in which the plurality of the partitions 241-246 is protruded from the inner surface 212 of the antenna body 210 to the central axis (C) may be constant. As a result, a vertical cross section of the plurality of the partitions 241-246, i.e., a cross section parallel with the central axis (C) of the antenna body 210 may have a rectangular shape.

As mentioned above, the plurality of the partitions 241-246 may have a polygon column shape with a sector-shaped bottom, according to the thickness (D) of the plurality of the partitions 241-246. When the thickness (D) of the plurality of the partitions 241-246 is sufficiently thin, the plurality of the partitions 241-246 may have a sector-shaped plate.

The plurality of the partitions 241-246, and the antenna body 210 may be formed of electrically conductive material, and the plurality of the partitions 241-246, and the antenna body 210 may be integrally manufactured or individually manufactured and then assembled together.

The radiation surface 220 may be divided into the plurality of the radiation apertures 221-226 by the plurality of the partitions 241-246. In other words, the plurality of the radiation apertures 221-226 may be formed on the radiation surface 220 by the antenna body 210 and the plurality of the partitions 241-246.

The structure of the radiation apertures 221-226 is the same as the structure of the radiation apertures 121-126 shown in FIG. 8, and thus a detailed description thereof will be replaced by the description of structures of the radiation apertures 121-126 shown in FIG. 8.

A feeding pin 231 configured to supply power to the antenna 200 may be provided on the feeding surface 230 of the antenna body 210.

The structure and function of the feeding pin 231 is the same as the structure and function of the feeding pin 131 shown in FIGS. 5 and 6, and thus a detailed description thereof will be replaced by the descriptions of structures and functions of the feeding pin 131 shown in FIGS. 5 and 6.

A high frequency radio wave generated in the inside of the antenna 200 by the feeding pin 231 may be divided by the plurality of the partitions 241-246 and then radiated via at least one of the radiation apertures 221-226 formed in the radiation surface 220.

Since a distance, in which each of the radio waves radiated via the radiation apertures 221-226 is radiated in the inside of the antenna 200, may be the same as each other, a phase and amplitude of the radio wave radiated through the radiation apertures 221-226 may be the same as each other.

Therefore, the radio wave radiated from the antenna 200 may have the directivity.

Hereinafter an antenna radiating a radio wave having directivity will be described according to exemplary embodiments.

Figure 12:
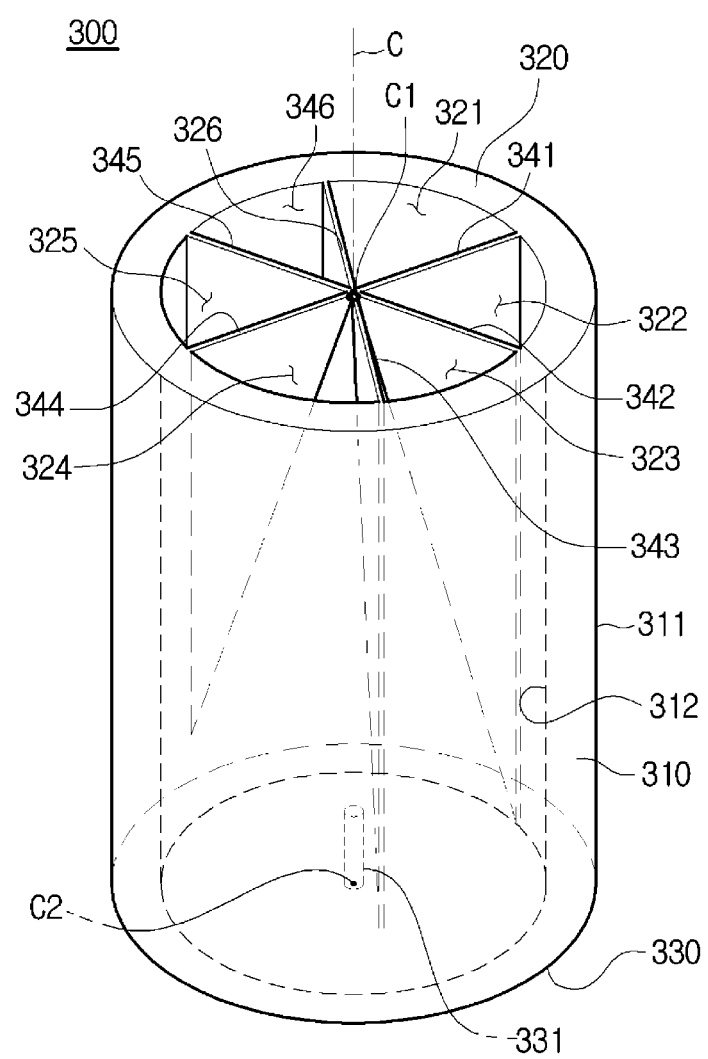
FIG. 12 is a view illustrating an antenna in accordance with exemplary embodiments of the present disclosure.
Figure 13:
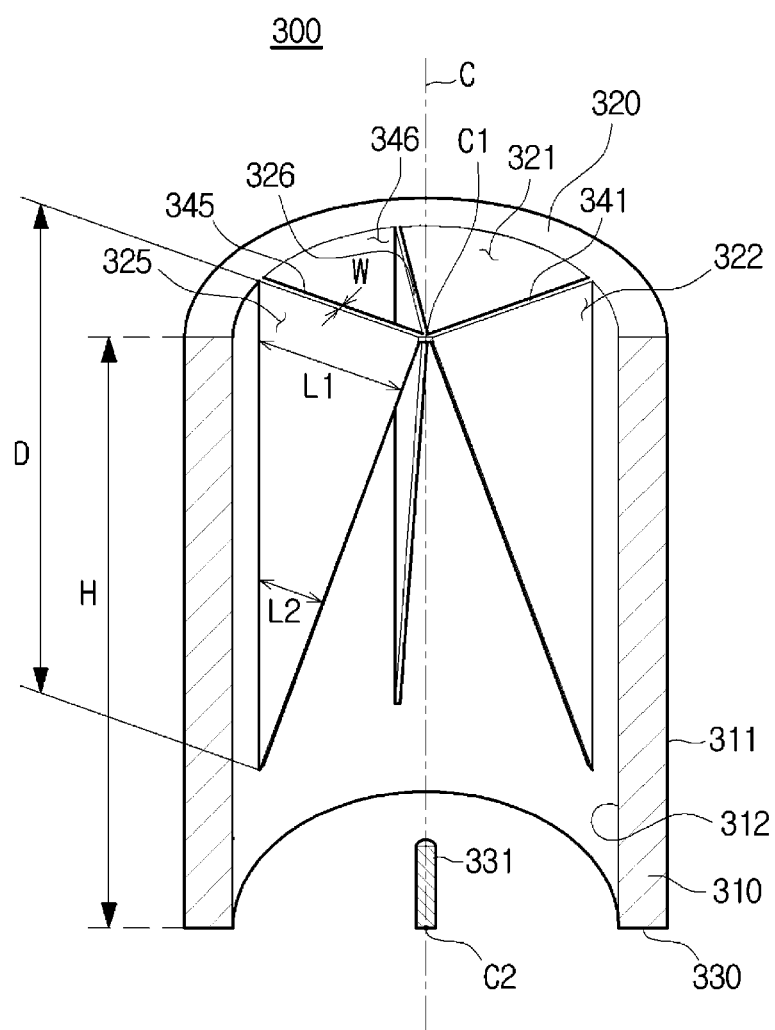
FIG. 13 is a vertical cross-sectional view illustrating the antenna shown in FIG. 12.
Figure 14:
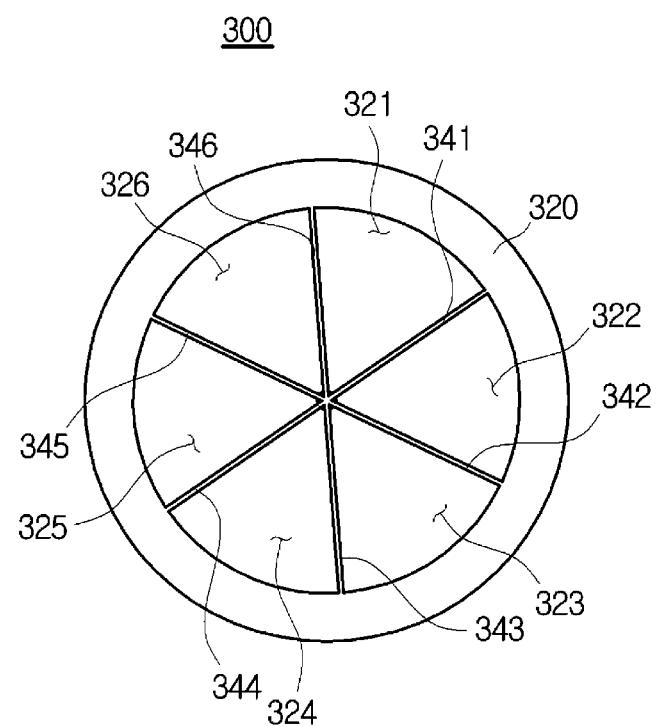
FIG. 14 is a view illustrating a radiation surface of the antenna shown in FIG. 12.

FIG. 12 is a view illustrating an antenna in accordance with exemplary embodiments of the present disclosure. FIG. 13 is a vertical cross-sectional view illustrating the antenna shown in FIG. 12. FIG. 14 is a view illustrating a radiation surface of the antenna shown in FIG. 12.

As illustrated in FIG. 12, an antenna 300 may include an antenna body 310 having a cylindrical shape with a hollow, hollow area or a cavity.

A radiation surface 320 and a feeding surface 330 may be formed in an upper side and a lower side of the antenna body 310, respectively. On the outside of the antenna body 310, an outer surface 311 may be formed along a circumference of the radiation surface 320 and the feeding surface 330, and in the inside of the antenna body 310, an inner surface 312 facing the hollow may be formed.

The structure of the antenna body 310 is the same as the structure of the antenna body 110 shown in FIG. 5, and thus a detailed description thereof will be replaced by the description of a structure of the antenna body 110 shown in FIG. 5.

In the inside of the antenna 300, a plurality of partitions 341, 342, 343, 344, 345 and 346 may be provided.

As illustrated in FIG. 13, the plurality of the partitions 341-346 may be protruded from the inner surface 312 of the antenna body 310 to a central axis (C) of the antenna body 310. A plurality of radiation apertures 221-226 may be formed between the plurality of the partitions 241-246.

However, the arrangement and the number of the plurality of the partitions 341-346 may be not limited to those shown in FIGS. 12 and 13.

The plurality of the partitions 341-346 may make contact with each other around the central axis (C) of the antenna body 310. Since the plurality of the partitions 341-346 makes contact with each other around the central axis (C) of the antenna body 310, the area around of center (C1) of the radiation surface 320 may be closed.

The plurality of the partitions 341-346 may be formed in a thin plate shape and a width (W) thereof may be constant.

The plurality of the partitions 341-346 may be downwardly extended from the radiation surface 320 of the antenna body 310 to the feeding surface 330. A distance (D) in which the plurality of the partitions 341-346 is extended from the radiation surface 320 to the feeding surface 330 may be less than a height (H) of the antenna body 310.

In addition, a length (L1 and L2) in which the plurality of the partitions 341-346 is protruded from the inner surface 312 of the antenna body 310 to the central axis (C) may vary inversely with a distance from the radiation surface 320. Particularly, the length (L1) in which the plurality of the partitions 341-346 adjacent to the radiation surface 320 of the antenna body 310 is extended to the central axis (C) may be larger than the length (L2) in which the plurality of the partitions 341-346 adjacent to the feeding surface 330 is extended from to the central axis (C).

As a result, the plurality of the partitions 341-346 may have a right triangle shape.

The plurality of the partitions 341-346 and the antenna body 310 may be formed of electrically conductive material, and the plurality of the partitions 341-346 and the antenna body 310 may be integrally manufactured or individually manufactured and then assembled together.

As illustrated in FIG. 14, the radiation surface 320 may be divided into the plurality of the radiation apertures 321-326 by the plurality of the partitions 341-346. In other words, in the radiation surface 320, the plurality of the radiation apertures 321-326 may be formed by the antenna body 310 and the plurality of the partitions 341-346.

The number of the radiation apertures 321-326 may be determined by the number of the partitions 341-346. For example, when the antenna 300 includes six partitions 341-346, six radiation apertures 321-326 may be formed. However, the number of the partitions and the number of the radiation apertures is not limited to six.

Since the plurality of the partitions 341-346 has a thin plate, an area of the plurality of the radiation apertures 321-326 may be similar to an area of a horizontal cross section of the hollow formed in the antenna body 210.

The plurality of the radiation apertures 321-326 may have a sector shape in which the central axis (C1) of the radiation surface 320 corresponds to a vertex.

When each of the plurality of the partitions 341-346 are apart from each other by the same distance along the inner surface 312 of the antenna body 310, each of the areas of the radiation apertures 321-326 may be the same as each other. Alternatively, when each of the plurality of the partitions 341-346 are irregularly disposed along the inner surface 312 of the antenna body 310, each of the area of the radiation apertures 321-326 may be different from each other.

Further, a diameter of the radiation surface 320, a height of the antenna body 310, and an area of the radiation apertures 321-326 may vary according to a frequency of radio wave intended to be radiated through the antenna 300.

A feeding pin 331 configured to supply power to the antenna 300 may be provided on the feeding surface 330 of the antenna body 310.

The structure and function of the feeding pin 331 is the same as the structure and function of the feeding pin 131 shown in FIGS. 5 and 6, and thus a detailed description thereof will be replaced by the description of structures and functions of the feeding pin 131 shown in FIGS. 5 and 6.

A high frequency radio wave generated in the inside of the antenna 300 by the feeding pin 331 may be divided by the plurality of the partitions 341-346 and then radiated via of the radiation apertures 321-326 formed in the radiation surface 320.

Since a distance in which each of the radio waves radiated via the radiation apertures 321-326 is radiated in the inside of the antenna 300 may be the same as each other, a phase and amplitude of the radio wave radiated through the radiation apertures 321-326 may be the same as each other.

Therefore, the radio wave radiated from the antenna 300 may have the directivity.

Hereinafter an antenna radiating a radio wave having directivity will be described according to exemplary embodiments.

Figure 15:
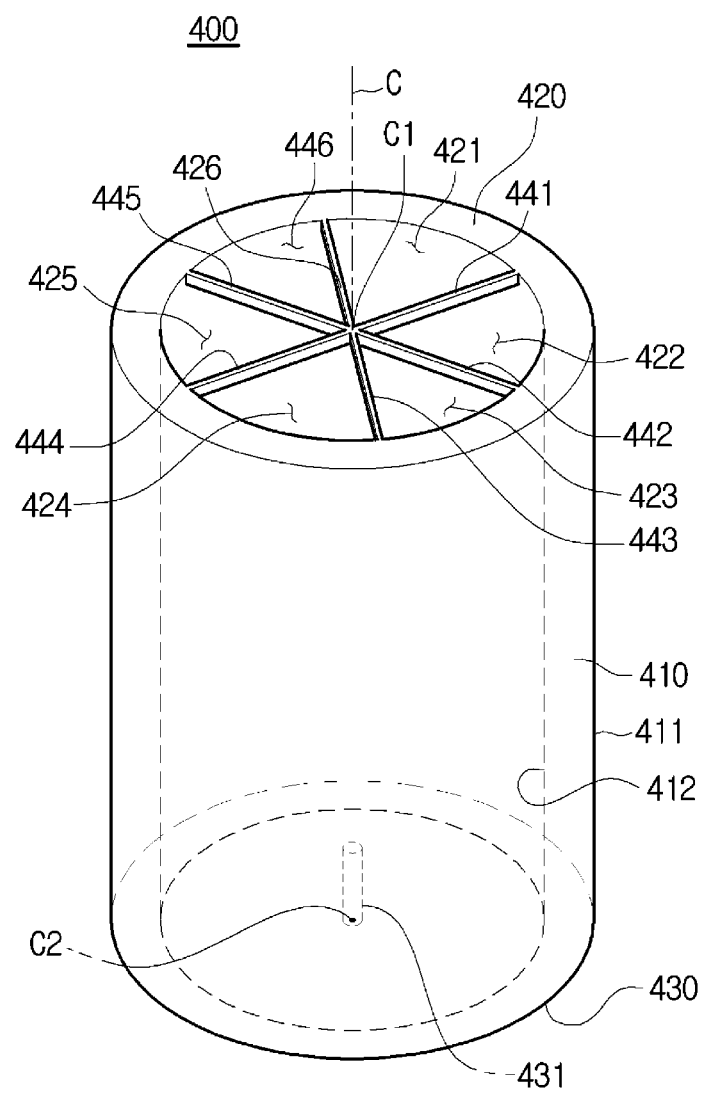
FIG. 15 is a view illustrating an antenna in accordance with exemplary embodiments of the present disclosure.
Figure 16:
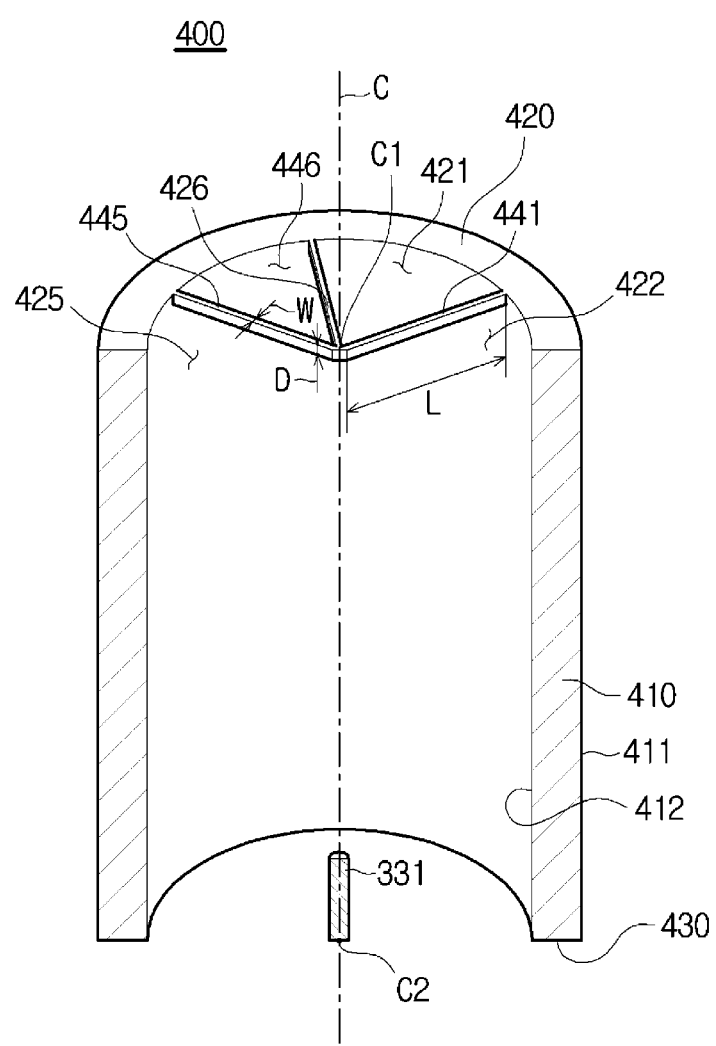
FIG. 16 is a vertical cross-sectional view illustrating the antenna shown in FIG. 15.

FIG. 15 is a view illustrating an antenna in accordance with exemplary embodiments of the present disclosure. FIG. 16 is a vertical cross-sectional view illustrating the antenna shown in FIG. 15.

As illustrated in FIG. 15, an antenna 400 may include an antenna body 410 having a cylindrical shape with a hollow, or hollow area or cavity.

A radiation surface 420 and a feeding surface 430 may be formed in an upper side and a lower side of the antenna body 410, respectively. In the outside of the antenna body 410, an outer surface 411 may be formed along a circumference of the radiation surface 420 and the feeding surface 430, and in the inside of the antenna body 410, an inner surface 412 facing the hollow may be formed.

The structure of the antenna body 410 is the same as the structure of the antenna body 110 shown in FIG. 5, and thus a detailed description thereof will be replaced by the description of structures of the antenna body 110 shown in FIG. 5.

In the inside of the antenna body 410, a plurality of partitions 441, 442, 443, 444, 445 and 446 may be provided.

As illustrated in FIG. 16, the plurality of the partitions 441-446 may be protruded from the inner surface 412 of the antenna body 410 to a central axis (C) of the antenna body 410. A plurality of radiation apertures 421-426 may be formed between the plurality of the partitions 441-446.

However, the arrangement and the number of the plurality of the partitions 441-446 may be not limited to those shown in FIGS. 15 and 16.

The plurality of the partitions 441-446 may make contact with each other around the central axis (C) of the antenna body 410. Since the plurality of the partitions 441-446 makes contact with each other around the central axis (C) of the antenna body 410, the area around of the center (C1) of the radiation surface 420 may be closed.

A length (L1) in which the plurality of the partitions 441-446 is protruded from the inner surface 412 to the central axis (C) may be constant. In addition, a width (W) of the plurality of the partitions 441-446 may be also constant and the width (W) of the plurality of the partitions 441-446 may be sufficiently thin.

The plurality of the partitions 441-446 may be downwardly extended from the radiation surface 420 of the antenna body 410 to the feeding surface 430. A distance in which the plurality of the partitions 441-446 is extended from the radiation surface 420 to the feeding surface 430, i.e., a thickness (D) may be constant and the thickness (D) of the plurality of the partitions 441-446 may be sufficiently thin.

When the width (W) and the thickness (D) of the plurality of the partitions 441-446 are sufficiently thin, the plurality of the partitions 441-446 may have a wire shape.

The plurality of the partitions 441-446 and the antenna body 410 may be formed of electrically conductive material, and the plurality of the partitions 441-446 and the antenna body 410 may be integrally manufactured or individually manufactured and then assembled together.

The radiation surface 420 may be divided into the plurality of the radiation apertures 421-426 by the plurality of the partitions 441-446. In other words, in the radiation surface 420, the plurality of the radiation apertures 421-426 may be formed by the antenna body 410 and the plurality of the partitions 441-446.

The structure of the radiation apertures 421-426 formed in the radiation surface 420 is the same as the structure of the radiation apertures 321-326 shown in FIG. 14, and thus a detailed description thereof will be replaced by the description of structures of the radiation apertures 321-326 shown in FIG. 14.

A feeding pin 431 configured to supply power to the antenna 400 may be provided on the feeding surface 430 of the antenna body 410.

The structure and function of the feeding pin 431 is the same as the structure and function of the feeding pin 131 shown in FIGS. 5 and 6, and thus a detailed description thereof will be replaced by the description of structures and functions of the feeding pin 131 shown in FIGS. 5 and 6.

A high frequency radio wave generated in the inside of the antenna 400 by the feeding pin 431 may be divided by the plurality of the partitions 441-446 and then radiated via at least one of the radiation apertures 421-426 formed in the radiation surface 420.

Since a distance, in which each of the radio waves radiated via the radiation apertures 421-426 is radiated in the inside of the antenna 400, may be the same as each other, a phase and amplitude of the radio wave radiated through the radiation apertures 421-426 may be the same as each other.

As a result, the radio wave radiated from the antenna 400 may have the directivity, respectively.

Hereinafter an antenna radiating a radio wave having directivity will be described according to exemplary embodiments.

Figure 17:
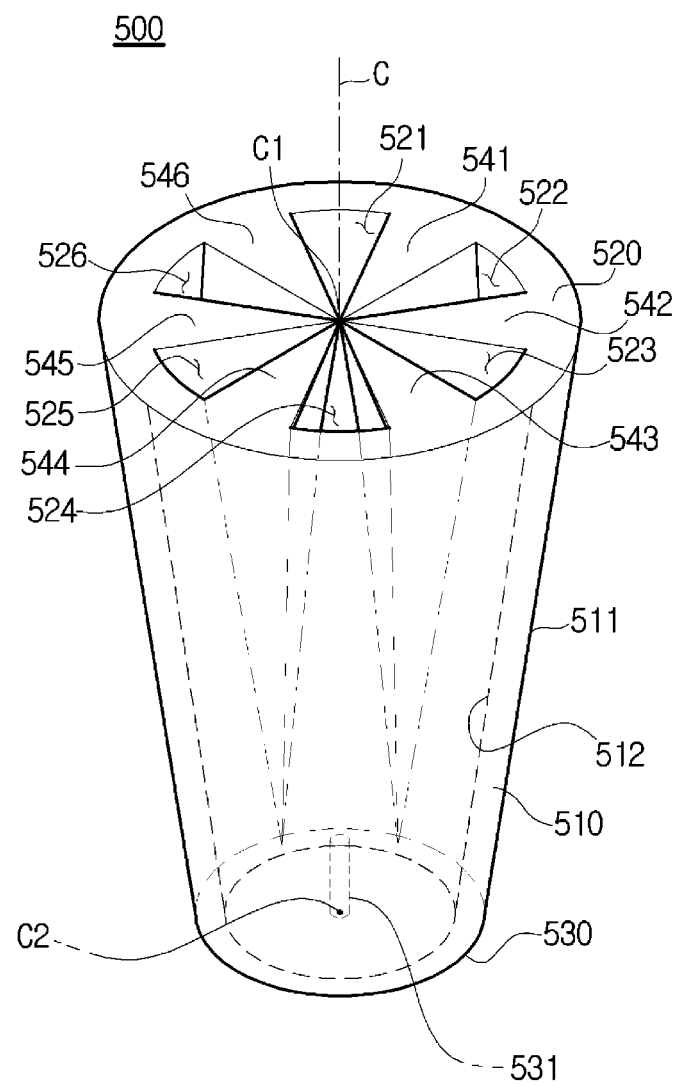
FIG. 17 is a view illustrating an antenna in accordance with exemplary embodiments of the present disclosure.

FIG. 17 is a view illustrating an antenna in accordance with exemplary embodiments of the present disclosure.

As illustrated in FIG. 17, an antenna 500 may include an antenna body 510 having a circular truncated cone shape with a hollow, a hollow area or a cavity.

A radiation surface 520 and a feeding surface 530 may be formed in an upper side and a lower side of the antenna body 510, respectively. The radiation surface 520 and the feeding surface 530 may be formed in a circular shape, and the radiation surface 520 and the feeding surface 530 may have a different diameter. For example, a diameter of the radiation surface 520 may be larger than a diameter of the feeding surface 530.

Further a center (C1) of the radiation surface 520 and a center (C2) of the feeding surface 530 may be disposed on a central axis (C) of the antenna body 510 having the cylindrical shape.

On the outside of the antenna body 510, an outer surface 511 may be formed along a circumference of the radiation surface 520 and the feeding surface 530. The outer surface 511 may be provided between the radiation surface 520 and the feeding surface 530.

In the inside of the antenna body 510, a hollow, hollow area or cavity passing through the antenna body 510 may be formed in a direction perpendicular to the radiation surface 520 and the feeding surface 530. The hollow may have a circular truncated cone shape and a central axis of the hollow may be identical to the central axis (C) of the antenna body 510.

Further, an inner surface 512 facing the hollow may be formed in the inside of the antenna body 510.

As a result, the antenna body 510 may have the circular truncated cone with the outer surface 511 and the inner surface 512 as well as opposite bottoms, i.e., the radiation surface and the feeding surface, and a vertical cross section of the antenna body 510 may have a trapezoid shape.

In the inside of the antenna 500, a plurality of partitions 541, 542, 543, 544, 545 and 546 may be provided.

The plurality of the partitions 541-546 may be protruded from the inner surface 512 of the antenna body 510 to the central axis (C) of the antenna body 510. Due to the plurality of the partitions 541-546, a part of the radiation surface 520 of the antenna body 510 may be closed, and a plurality of radiation apertures 521, 522, 523, 524, 525 and 526 may be formed between the plurality of the partitions 541-546. A detailed description of the plurality of the radiation apertures 521-526 will be described below.

FIG. 17 illustrates that the plurality of the partitions 541-546 is provided to be apart from each other by the same distance along the inner surface 512 of the antenna body 510, but the arrangement of the plurality of the partitions 541-546 is not limited thereto. For example, the plurality of the partitions 541-546 may be irregularly arranged along the inner surface 512 of the antenna body 510. Further, FIG. 17 illustrates that six partitions 541-546 are described, but the number of the partitions is not limited thereto. Thus, the number of the partitions may be less than or more than six.

The plurality of the partitions 541-546 may make contact with each other around the central axis (C) of the antenna body 510. Since the plurality of the partitions 541-546 makes contact with each other around the central axis (C) of the antenna body 510, the area around of the center (C1) of the radiation surface 520 may be closed.

A width (W1 and W2) of the plurality of the partitions 541-546 may vary inversely with a distance from the inner surface 512 of the antenna body 510 and may vary directly with a distance from the central axis (C) of the antenna body 510. Particularly, the width (W1) of the plurality of the partitions 541-546 adjacent to the inner surface 512 of the antenna body 510 may be larger than the width (W2) of the plurality of the partitions 541-546 adjacent to the central axis (C) of the antenna body 510.

As a result, a horizontal cross section of the plurality of the partitions 541-546, i.e. a cross section perpendicular to the central axis (C) of the antenna body 510, may have a sector shape. Particularly, the horizontal cross section of the plurality of the partitions 541-546 in the radiation surface 520 of the antenna body 510 may have a sector shape in which the central axis (C) of the antenna body 510 corresponds to a vertex.

In addition, the plurality of the partitions 541-546 may be downwardly extended from the radiation surface 520 of the antenna body 510 to the feeding surface 530.

In this time, a distance (D) in which the plurality of the partitions 541-546 is extended from the radiation surface 520 to the feeding surface 530 may be less than a height (H) of the antenna body 510. In other words, the plurality of the partitions 541-546 may be extended from the radiation surface 520 of the antenna body 510 to a certain height or to the feeding surface 530.

In addition, a length (L1 and L2) in which the plurality of the partitions 541-546 is protruded from the inner surface 512 of the antenna body 510 to the central axis (C) may vary inversely with a distance from the radiation surface 520. Particularly, the length (L1) in which the plurality of the partitions 541-546 adjacent to the radiation surface 520 of the antenna body 510 is extended to the central axis (C) may be larger than the length (L2) in which the plurality of the partitions 541-546 adjacent to the feeding surface 530 is extended to the central axis (C).

As a result, a vertical cross section of the plurality of the partitions 541-546, i.e., a cross section parallel with the central axis (C) of the antenna body 510 may have an acute triangle shape.

In addition, a horizontal cross section of the plurality of the partitions 541-546, that is an area of cross section perpendicular to the central axis (C) of the antenna body 510 may vary inversely with a distance from the radiation surface 520.

As a result, the plurality of the partitions 541-546 may have a polygonal pyramid shape with a sector-shaped bottom. In addition, a vertical cross section of the sector-shaped cone forming the plurality of the partitions 541-546 may be an acute triangle shape.

Since the plurality of the partitions 541-546 has the polygonal pyramid shape with a sector-shaped bottom, a radio wave inside of the antenna 500 may be smoothly divided along a side wall of the plurality of the partitions 541-546, and then radiated to the free space via the plurality of the radiation apertures 521-526 formed between the plurality of the partitions 541-546.

The plurality of the partitions 541-546 may be formed of electrically conductive material, as with the antenna body 510.

The plurality of partitions 541-546 and the antenna body 510 may be formed of electrically conductive material, and the plurality of partitions 541-546 and the antenna body 510 may be integrally manufactured with each other or may be individually manufactured and then assembled together.

The radiation surface 520 may be divided into the plurality of the radiation apertures 521-526 by the plurality of the partitions 541-546. In other words, the plurality of the radiation apertures 521-526 may be formed on the radiation surface 520 by the antenna body 510 and the plurality of the partitions 541-546.

The structure of the radiation apertures 521-526 formed in the radiation surface 520 is the same as the structure of the radiation apertures 121-126 shown in FIG. 8, and thus a detailed description thereof will be replaced by the description of structures of the radiation apertures 121-126 shown in FIG. 8.

A diameter of the bottom (the radiation surface) and the upper surface (the feeding surface), a height of the antenna body 510, and an area of the radiation apertures 521-526 may vary according to a frequency of radio wave intended to be radiated through the antenna 500.

A feeding pin 531 configured to supply power to the antenna 500 may be provided on the feeding surface 530 of the antenna body 510.

The structure and function of the feeding pin 531 is the same as the structure and function of the feeding pin 131 shown in FIGS. 5 and 6, and thus a detailed description thereof will be replaced by the description of structures and functions of the feeding pin 131 shown in FIGS. 5 and 6.

A high frequency radio wave generated in the inside of the antenna 500 by the feeding pin 531 may be divided by the plurality of the partitions 541-546 and then radiated via at least one of the radiation apertures 521-526 formed in the radiation surface 520.

In this time, since a distance, in which each of the radio wave radiated via the radiation apertures 521-526 is radiated in the inside of the antenna 500, may be the same as each other, a phase and amplitude of the radio wave radiated through the radiation apertures 521-526 may be the same as each other.

Therefore, the radio wave radiated from the antenna 500 may have the directivity.

As mentioned above, the antenna 500 may have the circular truncated cone shape, and include the radiation surface 520 in which the plurality of the radiation apertures 521-526 is formed. The radio wave radiated via the plurality of the radiation apertures 521-526 may have directivity focused on a direction perpendicular to the radiation surface 520.

As is apparent from the above description, according to the proposed antenna and vehicle having the same, it may be possible to minimize a space occupied by the antenna.

In addition, it may be possible to provide the antenna having a shape similar with a cable capable of transmitting a high frequency electrical signal and the vehicle having the antenna.

It may be possible to provide the antenna capable of outputting radio waves having a directional radial pattern and the vehicle having the antenna.

Although exemplary embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An antenna comprising:
 an antenna body comprising a cylinder having a hollow, the cylinder having a radiation surface, a feeding surface, an outer surface and an inner surface;
 a plurality of partitions protruding from the inner surface to a central axis of the antenna body;
 a feeding pin disposed on the feeding surface and radiating a radio wave to an inside of the antenna body; and
 a plurality of radiation apertures respectively arranged between the plurality of partitions in the radiation surface, the plurality of radiation apertures radiating the radio wave to a free space,
 wherein each of the plurality of partitions extends from the radiation surface to the feeding surface along the inner surface, and
 wherein a length of each of the plurality of partitions from the inner surface toward the central axis decreases in a direction from the radiation surface to the feeding surface.

2. The antenna of claim 1, wherein each of the plurality of the radiation apertures has the same area and the same shape as each other.

3. The antenna of claim 1, wherein each of the radiation apertures has a sector shape in which the central axis of the antenna body corresponds to a vertex.

4. The antenna of claim 1, wherein each of the plurality of the radiation apertures is apart from each other by the same distance along the inner surface.

5. The antenna of claim 1, wherein each of the plurality of the partitions is apart from each other by the same distance along the inner surface.

6. The antenna of claim 1, wherein each of the plurality of the partitions makes contact with each other in the central axis of the antenna body.

7. The antenna of claim 1, wherein a cross section of each of the plurality of the partitions in the radiation surface has a sector shape.

8. The antenna of claim 7, wherein each of the plurality of the partitions in the radiation surface has a sector-shaped cone shape, which is extended from the radiation surface along the inner surface.

9. The antenna of claim 7, wherein each of the plurality of the partitions in the radiation surface has a sector-shaped cylinder, which is extended from the radiation surface along the inner surface.

10. The antenna of claim 1, wherein the radio wave radiated from the feeding pin is divided by the plurality of the partitions and radiated to the free space via the plurality of the radiation apertures.

11. A vehicle comprising:
 an antenna configured to radiate and receive a radio wave to and from a free space, respectively, and comprising:
  an antenna body comprising a cylinder having a hollow, the cylinder having a radiation surface, a feeding surface, an outer surface and an inner surface;
  a plurality of partitions protruding from the inner surface to a central axis of the antenna body;
  a feeding pin disposed on the feeding surface and radiating the radio wave to an inside of the antenna body; and
  a plurality of radiation apertures respectively arranged between the plurality of partitions in the radiation surface, the plurality of radiation apertures radiating the radio wave to the free space,
 wherein each of the plurality of partitions extends from the radiation surface to the feeding surface along the inner surface, and
 wherein a length of each of the plurality of partitions from the inner surface toward the central axis decreases in a direction from the radiation surface to the feeding surface.

12. The vehicle of claim 11, wherein each of the plurality of the radiation apertures has the same area and the same shape as each other.

13. The vehicle of claim 11, wherein each of the plurality of the radiation apertures has a sector shape in which the central axis of the antenna body corresponds to a vertex.

14. The vehicle of claim 11, wherein each of the plurality of the radiation apertures is apart from each other by the same distance along the inner surface.

15. The vehicle of claim 11, wherein each of the plurality of the partitions is apart from each other by the same distance along the inner surface.

16. The antenna of claim 11, wherein each of the plurality of the partitions makes contact with each other in the central axis of the antenna body.

* * * * *